United States Patent [19]

Takeuchi

[11] Patent Number: 4,590,111
[45] Date of Patent: May 20, 1986

[54] FRAGRANCE RELEASING SHEET ARTICLE AND METHOD OF MAKING SAME

[75] Inventor: Keinosuke Takeuchi, Kadoma, Japan

[73] Assignee: Hakugen, Ltd., Tokyo, Japan

[21] Appl. No.: 542,341

[22] Filed: Oct. 17, 1983

[30] Foreign Application Priority Data

Oct. 21, 1982 [JP] Japan .................................. 159788[U]
Oct. 21, 1982 [JP] Japan .................................. 57-185846

[51] Int. Cl.⁴ .............................................. B44C 1/26
[52] U.S. Cl. ...................................... 428/67; 428/412;
428/413; 428/421; 428/474.4; 428/475.2;
428/476.3; 428/476.9; 428/501; 428/516;
428/517; 428/518; 428/519; 428/520; 428/522;
428/905

[58] Field of Search ................. 428/905, 67, 480, 483,
428/412, 476.3, 474.4, 475.2, 476.9, 501,
516–520, 522, 421, 413

[56] References Cited

U.S. PATENT DOCUMENTS 2,626,833  1/1953  Valentine ............................ 428/905
2,717,174  9/1955  Casanovas .......................... 428/905
3,685,734  8/1972  Paciorek et al. .................... 428/905

Primary Examiner—Edith Buffalow
Attorney, Agent, or Firm—Bucknam and Archer

[57] ABSTRACT

A fragrance releasing sheet article comprising a resin member with patterns and/or colors thereon and a fragrance releasing member comprising a resin and perfume, the pattern member and the fragrance releasing member being integrally constituted; and a method of making such sheet article.

10 Claims, 7 Drawing Figures

FRAGRANCE RELEASING SHEET ARTICLE AND METHOD OF MAKING SAME

BACKGROUND OF THE INVENTION

1. Field of the Invention

This invention relates to fragrance releasing sheet articles with various patterns and colors and a method of making the same.

2. Brief Description of the Prior Art

In the past, fragrant articles have been made by forming a subliming aromatic material into a specific shape, or by impregnating a perfume into a synthetic resin previously formed into the specific shape.

In those prior aromatic articles, the appearance has been limited by structural factors. For example, the color has been limited to simple colors dictated by the basic coloring of the fragrant material or by the basic coloring of the synthetic resin material. Also, the patterns of the articles have been limited mainly to those applied from the exterior.

Further, as for the method for producing the above-mentioned prior aromatic articles, there have been applied only relatively simple processes, i.e. of forming a specially colored material into a specific shape by shaping or molding, or dipping a previously formed synthetic resin material in a perfume for a given period of time.

SUMMARY OF THE INVENTION

The present invention has been accomplished on the basis of a novel technical idea quite different from the principal idea of the prior art as described above. The inventor of the present invention has succeeded in obtaining fragrance releasing sheet articles which, compared with the prior aromatic articles, can be provided with various pattern and/or colors on the outer surface thereof, while maintaining a suitable volatility of the fragrant component, i.e. gradually releasing property.

The present invention relates to a fragrance releasing sheet article with patterns, and/or colors composed of a member with patterns and/or colors (hereinafter referred to as a "pattern member") formed of a thermoplastic or thermosetting resin and a fragrance releasing member composed of a transparent or semitransparent thermoplastic or thermosetting resin into which a perfume, plasticizer and stabilizer and optionally a coloring agent or the like are incorporated, the pattern member and the fragrance releasing member being integrally constituted. In accordance with the present invention, the sheet article can be obtained by the process of forming a thin pattern member of thermoplastic or thermosetting resin with appropriate patterns and/or colors and separately preparing the molding material for the fragrance releasing member by incorporating a plasticizer, stabilizer and perfume and optionally a coloring agent, fungicide or the like into the transparent or semitransparent thermoplastic or thermosetting resin; and molding the above material in such that the pattern member is enclosed with the fragrance releasing member or is put or sandwiched between the fragrance releasing members, into the sheet molding.

DESCRIPTION OF THE INVENTION INCLUDING THE PREFERRED EMBODIMENTS

Figure 1:
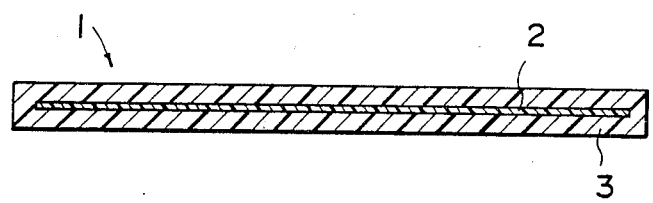
FIG. 1 is a cross-section of the fragrance releasing sheet article according to this invention and FIG. 2 is a plan view of the article of FIG. 1.

The fragrance releasing sheet article of the present invention is generally produced by a method comprising forming a thin pattern member of a desired shape of thermoplastic or thermosetting resin material by conventionally known means such as injection molding, extruding, transfer molding, compression molding, cast molding, punching or the like, said member having appropriate patterns and/or colors and separately preparing a molding material for a fragrance releasing member composed of a transparent or semitransparent thermoplastic or thermosetting resin material into which a plasticizer, perfume, stabilizer and the like are incorporated; and then molding the above molding material in such manner that the pattern member is enclosed with the fragrance releasing member or is put or sandwiched between the fragrance releasing members, into the sheet product.

The resin used as the materials for the pattern member includes the known thermoplastic or thermosetting resin. Preferably, there may be applied materials which are adhesible to or possess mutual affinity with the resin for the fragrance releasing member. The resin for the pattern member may be the same as or differ from that of the fragrance releasing member. As a thermoplastic resin, there can be used, for example, vinyl resin such as polyvinyl chloride, polystyrene resin, acryl resin, polyamide resin, polyester resin, olefine resin, polycarbonate resin or the like. As a thermosetting resin, there can be used, for example, urea resin, phenol resin, epoxy resin or the like. Where the resin material for the fragrance releasing member is a rigid polyvinyl chloride, for the pattern member there may be applied a film of polyester resin or polyvinyl chloride resin, said film having patterns and/or colors thereon.

Patterns and/or colors may be put on the pattern member by conventional method, for example, the known printing technique such as transfer printing, hot-stamping, silk screen printing, gravure printing, offset printing or the like.

As for the pattern member, there may also be used a member which is obtained by molding or punching a thermoplastic resin, e.g. rigid polyvinyl chloride resin, into a thin, rigid base plate and adhering a patterned and/or colored film of polyester to the plate, the two preferably being adhered with an adhesive (e.g. adhesive of acryl type, vinyl chloride type or the like). Use of this pattern member is preferable because the rigidity of the thin base plate makes it possible to carry out the succeeding step under stable condition.

The pattern member has the function of a supporting plate for the fragrance releasing product.

Also, as for the resin used as the material for the fragrance releasing member, there is required a material which allows the perfume contained in the article to sustainedly release fragrance at room temperature. Such materials may be transparent or semitransparent thermoplastic or thermosetting resins. As for the thermoplastic resin, for example, there may be used AS resin, ACS resin, EVA resin, ABS resin, ethylene-vinyl alcohol copolymer resin, vinyl chloride resin, vinyl chloride elastomeric resin, MBS resin, chlorinated polyethylene, polyether resin, polyamide resin, polyamide elastomer, polyacrylate resin, polyacetal resin, polyester resin, high-pressure-produced polyethylene, moderate-pressure-produced polyethylene, butadien resin, polycarbonate resin, polystyrene resin, fluorine resin, polypropylene, methacrylic resin, methylpentene resin or the like. The thermosetting resin may include, for example, urea resin, phenol resin, epoxy resin and the like.

The material for the fragrance releasing member may be in the form of any molding material used in known molding methods such as injection molding, extruding, cast molding, slush molding or the like. For example, it can be in the form of pellet, powder or paste.

The pellets may comprise, for example, 100 parts by weight of polyvinyl chloride (the degree of polymerization: 600–900); about 40–120 parts by weight of a plasticizer, e.g. dioctyl phthalate (D.O.P.) and the like, about 1–4 parts by weight of a stabilizer, e.g. calcium stearate and the like; and about 10–50 parts by weight of a perfume and, as occasion demands, about 0.01–0.05 parts by weight of a fungicide and can be obtained in accordance with a conventional method. The paste can be produced by blending 100 parts by weight of polyvinyl chloride (the degree of polymerization: 700–800); about 80–100 parts by weight of a plasticizer, e.g. phthalate such as D.O.P. and adipate such as dioctyl adipate; about 2–3 parts by weight of a stabilizer, e.g. calcium stearate, calcium carbonate, calcium sulfate and the like; and about 10–50 parts by weight of a perfume and, as occasion demands, about 0.01–0.05 parts by weight of a fungicide, e.g. thiazolyl benzimidazole (TBZ), N-(fluorodichloromethylthio)-phthalimide, "Vinyzene" (Thiokol Co. / Ventron Division, 154 Andover Street, Danvers, Massachusetts, U.S.A.) and the like. If desired, there may be used a coloring material or a diluent to adjust the viscosity of the paste composition.

As for the perfume to be added in the above step, it is desirable that it does not volatize or decompose when subjected to the predetermined temperature of the succeeding step. However, some volatilization of the perfume is unavoidable in the succeeding step and thus the perfume should be selected and used assuming that there will be some amount of volatilization and change in fragrance due to heating in this step. It should be understood that the perfume may be appropriately selected and blended so as to provide the fragrance required by the users. These perfumes should be miscible with the plasticizer.

For example, when the resin material for the fragrance releasing member is polyvinyl chloride, the perfume may include linaloe oil, rose wood oil, coriander oil and other oils having linalool as the principal component; geranium oil, eucalyptus oil, rose oil, citronella oil, palmarosa oil and other oils having geraniol as the principal component, mint oil having l-menthol as the principal component, and the like. Also, the perfume may be a mixture of any of the above.

Next, the above molding material for the fragrance releasing member is molded into the form of the sheet in such manner that the pattern member, which may have a plane or uneven surface, is enclosed in the fragrance releasing member or is put or sandwiched between the fragrance releasing members (laminates).

In the above step, the molded sheet article can be obtained generally by placing the pattern member in a mold and injecting the molding material for the fragrance releasing member into the mold so as to enclose the pattern member and thus to form the sheet article. Alternatively, the sheet article can be obtained by pouring or casting the paste material for the fragrance releasing member into a mold, allowing it to gel under heating, then placing the pattern member thereon and pouring or casting the paste material on the member so as to sandwiched the pattern member or to enclose it and thus to form the sheet, thereafter carrying out heating. The fragrance releasing member may be tightly bonded to the pattern member since the material for the fragrance releasing member is heated to the predetermined temperature, and thus there can be obtained the sheet molding with a sharp pattern and/or color.

As described above, the fragrance releasing sheet article of this invention can be produced in various patterns and/or colors by means of existing production equipment and simple processes.

The fragrance releasing sheet article according to this invention may be utilized in various ways: it may be dangled or hung or be set in close contact with a wall or glass surface, while it is also possible to use it as a tablecloth and for similar such applications. The fragrant article therefore can also be ornamental in function, as a picture, and thus comes to possess a correspondingly great utility.

The following are examples of this invention. These are presented for explanatory purposes and are not to be considered as limiting the invention in any way.

EXAMPLE 1

Figure 2:
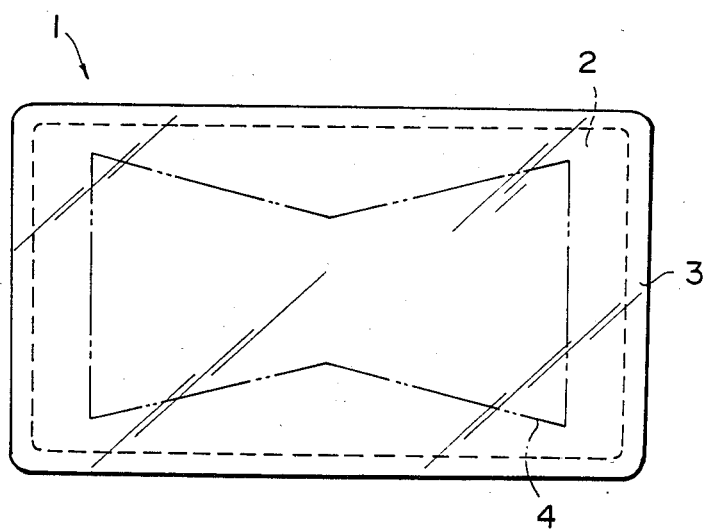

The fragrance releasing sheet article as shown in FIGS. 1 and 2 was produced in accordance with the following steps.

A pattern member 2 was produced by gravure-printing a colored pattern on a polyester film. Also, a molding material for a fragrance releasing member was produced by incorporating 30 parts by weight of perfume comprising linaloe oil, eucalyptus oil and mint oil into a paste composition comprising 100 parts by weight of polyvinyl chloride (the degree of polymerization: 800) which was prepared by an emulsion polymerization method, 100 parts by weight of dioctyl phthalate, 2 parts by weight of calcium stearate and 0.01 parts by weight of TBZ.

The material for the fragrance releasing member was poured in a mold and was heated in a heating oven at 180° C. for 20 minutes. Then, the pattern member was positioned on the hardened material so as to induce no air bubble between the two, then the material for the fragrance releasing member was poured thereon and thereafter heated in the heating oven at 180° C. for 20 minutes. The resulting molding was withdrawn from the oven, cooled and removed from the mold, producing the fragrance releasing sheet product 1.

Figure 3:
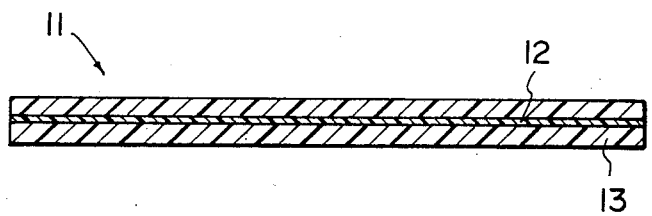
FIG. 3 is a cross-section of another fragrance releasing sheet article according to this invention and FIG. 4 is a plan view of the article of FIG. 3.

In FIGS. 1 and 2, 3 is the fragrance releasing member and 4 is colored patterns on the pattern member 2.

Figure 4:
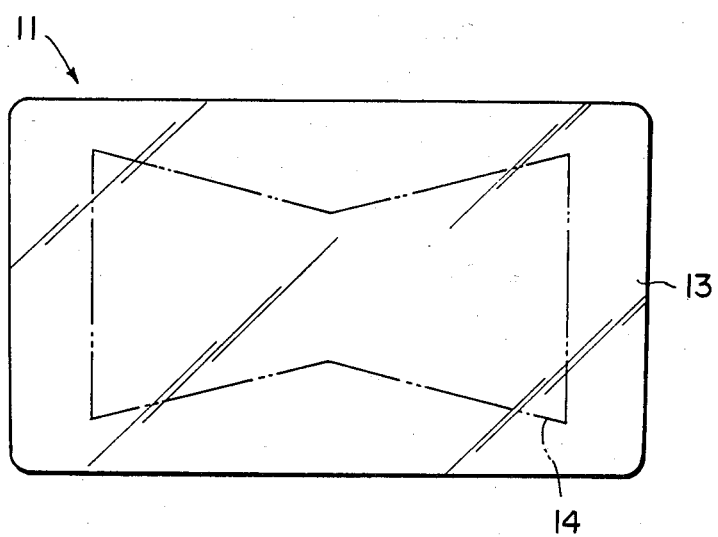

Another fragrance releasing sheet product 11 shown in FIGS. 3 and 4 was obtained in the same way as the above process. In the drawings, 12 is the pattern member, 13 is the fragrance releasing member and 14 is colored patterns on the pattern member 12.

EXAMPLE 2

Figure 5:
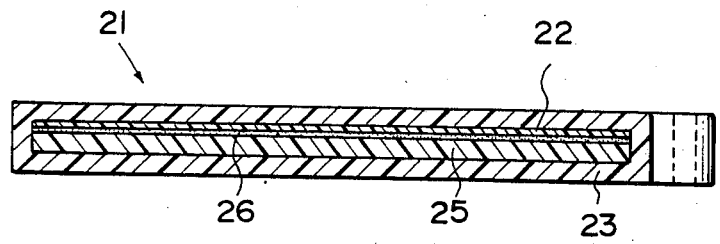
FIG. 5 is a cross-section of further fragrance releasing sheet article according to this invention and FIG. 6 is a plan view of the article of FIG. 6.
Figure 6:
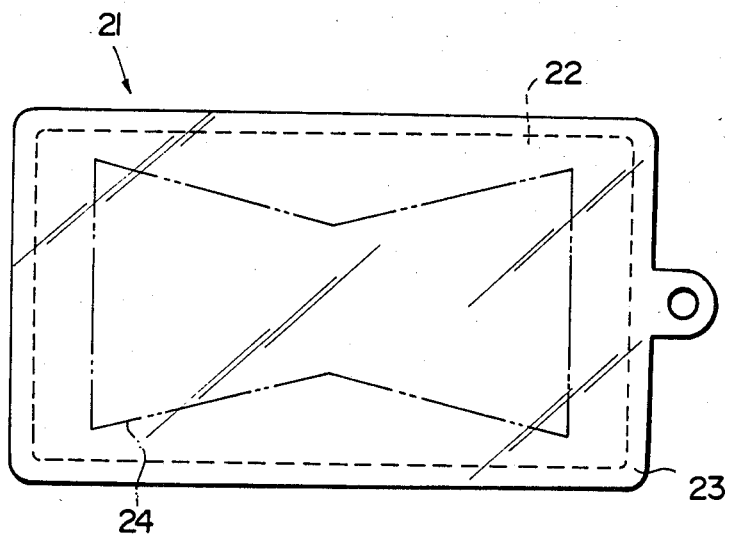

The fragrance releasing sheet article as shown in FIGS. 5 and 6 was produced as follows:

A polyester film 22 on which a colored pattern had been gravure-printed was adhered onto a thin base plate 25, which was obtained from a composition of a rigid polyvinyl chloride resin by means of a conventional injection molding, with an acrylic adhesive to form a pattern member, the composition comprising 100 parts by weight of polyvinyl chloride, 30 parts by weight of dioctyl phthalate and 2 parts by weight of calcium stearate.

Also, pellet material for a fragrance releasing member, which comprises 100 parts by weight of polyvinyl chloride, 80 parts by weight of dioctyl phthalate, 2 parts by weight of calcium stearate, 0.05 parts by weight of TBZ and 30 parts by weight of perfume comprising linaloe oil, eucalyptus oil and mint oil, was produced in accordance with a conventional method.

Then, the above pattern member was positioned in a mold. Thereafter, injection molding was carried out at a molding temperature of 180° C. to enclose the pattern member with the material for the fragrance releasing member to thereby integrally mold them into a sheet product. Thus, the fragrance releasing article was obtained.

In FIGS. 5 and 6, 23 is the fragrance releasing member, 24 is colored patterns on the patterned film 22 and 26 is a layer of adhesive.

As regards the material for the rigid base plate 25, in addition to polyvinyl chloride resin, there can be used a thermoplastic resin such as polycarbonate resin, polymethylpentene resin, polypropylene resin, polyester resin, polyamide resin, styrene resin, acrylic resin or the like.

Next, the following test was carried out in order to estimate the fragrance releasing articles 1 and 21 which were obtained as per the above Examples 1 and 2.

Each article was left stand at room temperature and after a given period, measured in days, a skilled panel of five persons judged whether the article still possessed the fragrance or not. The panel found that all the articles possessed fragrance even after two months.

Figure 7:
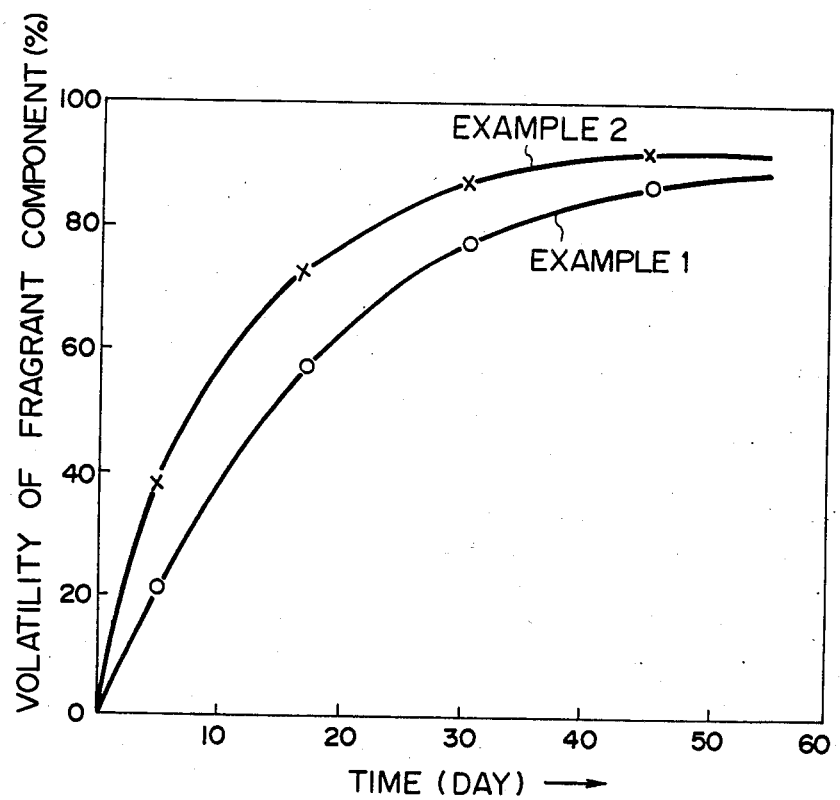
FIG. 7 is a graph showing the change of the volatility with time of the fragrance component.

Furthermore, in order to show the relationship of the change in volatility of the fragrance component with the length of time (in days), the following experiment was carried out. Articles 1 and 21 of Examples 1 and 2, respectively, were put in a closed box (0.7 m$^3$) maintained at 30° C. After a certain period as shown in FIG. 7, the box was open, and the test sample removed and weighed. Volatility was estimated as follows.

Volatility (%) =

$$\frac{\text{Volatilized amount of fragrance component}}{\text{Amount of fragrance component used}} \times 100$$

FIG. 7 shows that the articles maintained their fragrance for more than one month.

What is claimed is:

1. A fragrance releasing sheet article comprising a pattern member with colorless and colored patterns thereon which is formed of a thermoplastic or thermosetting resin and a fragrance releasing member composed of a transparent or semitransparent thermoplastic or thermosetting resin and perfume, said fragrance releasing member and said pattern member being integrally constituted said fragrance releasing member adhering to said pattern member, the pattern member being in the interior and the fragrance releasing member being in the exterior of said sheet article.

2. An article according to claim 1, wherein the thermoplastic resin material for the pattern member is a member selected from the group consisting of vinyl resin, polystyrene resin, acrylic resin, polyamide resin, polyester resin, olefin resin and polycarbonate resin.

3. An article according to claim 1, wherein the transparent or semitransparent thermoplastic resin material for the fragrance releasing member is a member selected from the group consisting of AS resin, ACS resin, EVA resin, ABS resin, ethylene-vinylalcohol copolymer resin, vinyl chloride resin, vinyl chloride elastomeric resin, MBS resin, chlorinated polyethylene resin, polyether resin, polyamide resin, polyamide elastomeric resin, polyacrylate resin, polyester resin, polyacetal resin, high-pressure-produced polyethylene, moderate-pressure-produced polyethylene, butadiene resin, polycarbonate resin, polystyrene resin, fluorine resin, polypropylene, methacrylic resin and methylpentene resin.

4. An article according to claim 1, wherein the thermosetting a member selected from the group consisting of urea resin, phenol resin and epoxy resin.

5. An article according to claim 1, wherein the patterns and/or colors are put on the pattern member by a printing technique consisting of transfer printing, hot-stamping, silk screen printing, gravure printing or offset printing.

6. An article according to claim 1, wherein the pattern member is a polyester film on which the patterns and/or colors are photogravured.

7. An article according to claim 1, wherein the pattern member comprises a rigid base plate composed of a thermoplastic resin selected from the group consisting of rigid polyvinyl chloride resin, polycarbonate resin, polymethylpentene resin, polypropylene resin, polyester resin, polyamide resin, styrene resin and acrylic resin, and a polyester film which is adhered to said base plate, patterns and/or colors being printed on said film.

8. The sheet article according to claim 1 wherein said fragrance releasing article additionally comprises a member selected from the group consisting of plasticizers, stabilizers, coloring agents, fungicides and mixtures thereof.

9. The sheet article according to claim 1 wherein the pattern member is sandwiched between two layers of the fragrance releasing member.

10. The sheet article according to claim 1 wherein the pattern member has an uneven surface and is enclosed in said sheet article.

* * * * *